(12) United States Patent
Krulik et al.

(10) Patent No.: US 6,582,605 B2
(45) Date of Patent: Jun. 24, 2003

(54) METHOD OF TREATING INDUSTRIAL WASTE WATERS

(75) Inventors: Gerald A. Krulik, San Clemente, CA (US); Josh H. Golden, Santa Cruz, CA (US)

(73) Assignee: Ionics, Incorporated, Watertown, MA (US)

( * ) Notice: Subject to any disclaimer, the term of this patent is extended or adjusted under 35 U.S.C. 154(b) by 0 days.

(21) Appl. No.: 09/894,527

(22) Filed: Jun. 27, 2001

(65) Prior Publication Data
US 2002/0088759 A1 Jul. 11, 2002

Related U.S. Application Data
(60) Provisional application No. 60/216,776, filed on Jul. 7, 2000.

(51) Int. Cl.[7] ............................................. C02F 1/54
(52) U.S. Cl. ................. 210/638; 210/639; 210/651; 210/652; 210/719; 210/721; 210/725; 210/726; 210/727; 210/908
(58) Field of Search ............................. 210/719, 721, 210/638, 639, 724, 725, 726, 727, 757, 759, 908, 651, 652

(56) References Cited

U.S. PATENT DOCUMENTS

| | | | | |
|---|---|---|---|---|
| 4,321,143 A | * | 3/1982 | Wilms et al. ............... | 210/631 |
| 4,724,084 A | * | 2/1988 | Pahmeier et al. ........... | 210/709 |
| 5,472,619 A | * | 12/1995 | Holzhauer et al. ......... | 210/705 |
| 5,651,894 A | * | 7/1997 | Boyce et al. ................ | 210/638 |
| 5,871,648 A | * | 2/1999 | Allen et al. ................. | 210/638 |
| 5,900,220 A | * | 5/1999 | Allen ......................... | 210/650 |
| 5,904,853 A | * | 5/1999 | Allen et al. ................. | 210/638 |
| 6,245,121 B1 | * | 6/2001 | Lamy et al. ..................... | 71/1 |
| 6,428,705 B1 | * | 8/2002 | Allen et al. ................. | 210/638 |

* cited by examiner

Primary Examiner—Peter A. Hruskoci

(57) ABSTRACT

A method of treating industrial wastewaters is provided. Specifically, the wastewater includes one or more organic contaminant materials and is pre-treated prior to filtering by the following steps The pH of the wastewater is adjusted to a pH in the range of about 2 to 6, and a combination of iron salts and peroxide are added to the wastewater and allowed to react for a period of at least about three minutes. Next, the pH of the wastewater is adjusted upwards to a value of at least 7 and precipitating or flocculating agents are added to form an insoluble contaminant bearing compound. The compound is then filtered from the wastewater thereby removing the contaminant materials from the wastewater. This invention is particularly suited for use with single pass flow-through filters, and most particularly suitable for high flow rate single pass flow-through filters. The method of the present invention results in minimization of filter clogging and maintenance of high filtration flow rates, with reduced need for cleaning cycles using lengthy treatment by acid based or detergent mixtures.

20 Claims, 2 Drawing Sheets

METHOD OF TREATING INDUSTRIAL WASTE WATERS

CROSS REFERENCE TO RELATED APPLICATIONS

This application claims the benefit of provisional patent application Serial No. 60/216,776, filed Jul. 7, 2000, the disclosure of which is hereby incorporated by reference. This application is related to U.S. patent applications Ser. No. 09/894,275 entitled "Method of Treating Semiconductor Waste Waters" ) and Ser. No. 09/894,228 entitled "System and Method for Removal of Arsenic from Aqueous Solutions"), both of which are filed simultaneously herewith, and the disclosures of each are hereby incorporated by reference in their entirety.

FIELD OF THE INVENTION

The present invention relates generally to a method of treating wastewaters produced during industrial processing. More specifically, the present invention relates to a method of treating industrial wastewaters by employing a combination of peroxide and iron salts to pre-treat the wastewater prior to removing contaminant materials by filtration.

BACKGROUND OF THE INVENTION

The treatment of wastewaters is a complex field. The complexities are due in part because the concentration and identity of the contaminant materials to be treated are constantly changing. Additionally, the flow rate, pH, oxidation potential, concentration of solids and temperature of the wastewater, among other factors, are also variable. Further, many wastewaters contain organic matter, including colloids, dissolved ionic matter, dissolved non-ionic matter, surfactants, and suspended solids. Such contaminant materials are present in combination with similar types of inorganic materials. Industrial wastewaters produced during industrial processing such as, electroplating, printed circuit manufacturing and machining, have proven difficult to treat due to the many different types of contaminants present in the wastewater. Despite these facts, filtration is a key part of most wastewater treatment plans. Many dissolved materials can be most easily removed if they are converted to an insoluble solid. Pre-existing solids removal is also usually necessary.

Filtration systems using many different types of filters have found wide use for the treatment of wastewaters. A common problem with such systems is the frequent need to clean or replace the filters due to fouling and clogging. Frequent filter cleaning is inefficient and wastes large amounts of chemicals. Frequent filter cleaning also requires the use of larger filtration apparatus to compensate for the downtime during cleaning. Frequent filter replacement is likewise wasteful of resources.

Many techniques have been employed by prior systems to address this problem. Sand filtration, using a graded series of layers of particles of different sizes and densities, is one example of a technique used to minimize backflushing and regeneration, while maintaining high filtration rates without the use of chemicals. However, sand filtration is most suited for potable and sanitary water facilities. Facilities which desire to recover or reuse treated water need a better method.

Cross-flow filtration methods are commonly used to reduce filter fouling. However, this type of filtration involves high pressures and high velocity flow rates. Only a fraction of the water is filtered at each pass across the filter membranes, so the process is energy inefficient.

Traditional bag filters clog easily and give reduced filtration flow rates after short periods of use. They are also difficult to effectively clean. Chemical treatments are often used to decrease filter loadings by precipitating the bulk of materials using organic or inorganic precipitating and flocculating materials. The solids are then largely allowed to settle and are removed by decantation or other means. The remaining liquid often contains many fine and/or colloidal particles, and must be subsequently filtered.

An improved method and system for providing high flow rate, single pass, flow-through filtration, has been developed as described in U.S. Pat. Nos. 5,871,648, 5,904,853 and 5,900,220, the disclosures of which are hereby incorporated by reference in their entirety. These systems uses a combination of organic and inorganic flocculating and precipitating agents to form large, nonsticky particles in the treated wastewater. The large particles form a loose, non-adherent layer on the surface of a filter element, which allow high flow rates through the particles. Cleaning is relatively simple by using a short period of water backflush. While these systems have provided an advance in the art, it is desirable to further improve the filtration process, and to provide a method that is suited for removing the many types of contaminant materials found in industrial wastewaters.

SUMMARY OF THE INVENTION

Accordingly, it is an object of the present invention to provide an improved method of treating industrial wastewaters. In particular, the inventors have unexpectedly found that a significant improvement in the prior art process can be effected by pre-treating a wastewater with a combination of an iron salts and peroxide, prior to forming particles which are then filtered. This inventive method provides a more effective treatment of the wastewater, and of significant advantage the method is suitable for a wide variety of contaminant materials. Further, the method of the present invention decreases the cleaning frequency of the filtration systems, maintains high filtration flow rates, and is simple to implement.

In general, the present invention provides a method for treating industrial wastewaters including one or more contaminant materials, characterized in that the industrial wastewaters to be filtered are pre-treated with a combination of iron salts and peroxide at a pH in the range of about 2 to 6 prior to filtration.

In another aspect, the present invention provides a method of treating industrial wastewaters, comprising the steps of: providing a wastewater containing one or more contaminant materials. Iron salts and peroxide are added to the wastewater. The pH of the wastewater is adjusted to a pH in the range of about 2 to 6, and the resultant reaction is allowed to occur for at least about ten minutes.

After the specified period of time has elapsed, precipitating and/or flocculating agents are added to the wastewater. The pH is now adjusted preferably to a pH of 7 or greater, and contaminant bearing particles (also referred to a floc or precipitate) are formed. The wastewater is then filtered to remove the contaminant bearing particles. The wastewater may be filtered by any number of prior art systems, and the present invention is particularly suited for practice with single pass flow-through filters, and most particularly suitable for high flow rate single pass flow-through filters. The pretreatment step according to the present invention prior to filtration minimizes clogging and the frequency between cleaning cycles, while maintaining high filtration flow rates. It has been found that by employing the pre-treatment step of the present invention, the precipitate that is subsequently formed is more easily filtered, which reduces or minimizes the fouling of the filter membrane. Thus, another aspect of the invention is a method for minimizing the fouling of filters in a wastewater filtration system which receives wastewater containing contaminant materials, characterized in that wastewater is pre-treated with a combination of iron salts and peroxide prior to filtering said contaminant materials from the wastewater.

BRIEF DESCRIPTION OF THE DRAWINGS

These and other objects and advantages of the present invention will become more fully apparent upon reading the detailed description of the invention and the appended claims provided below, and upon reference to the drawings, in which:

DETAILED DESCRIPTION OF THE INVENTION

Figure 1:
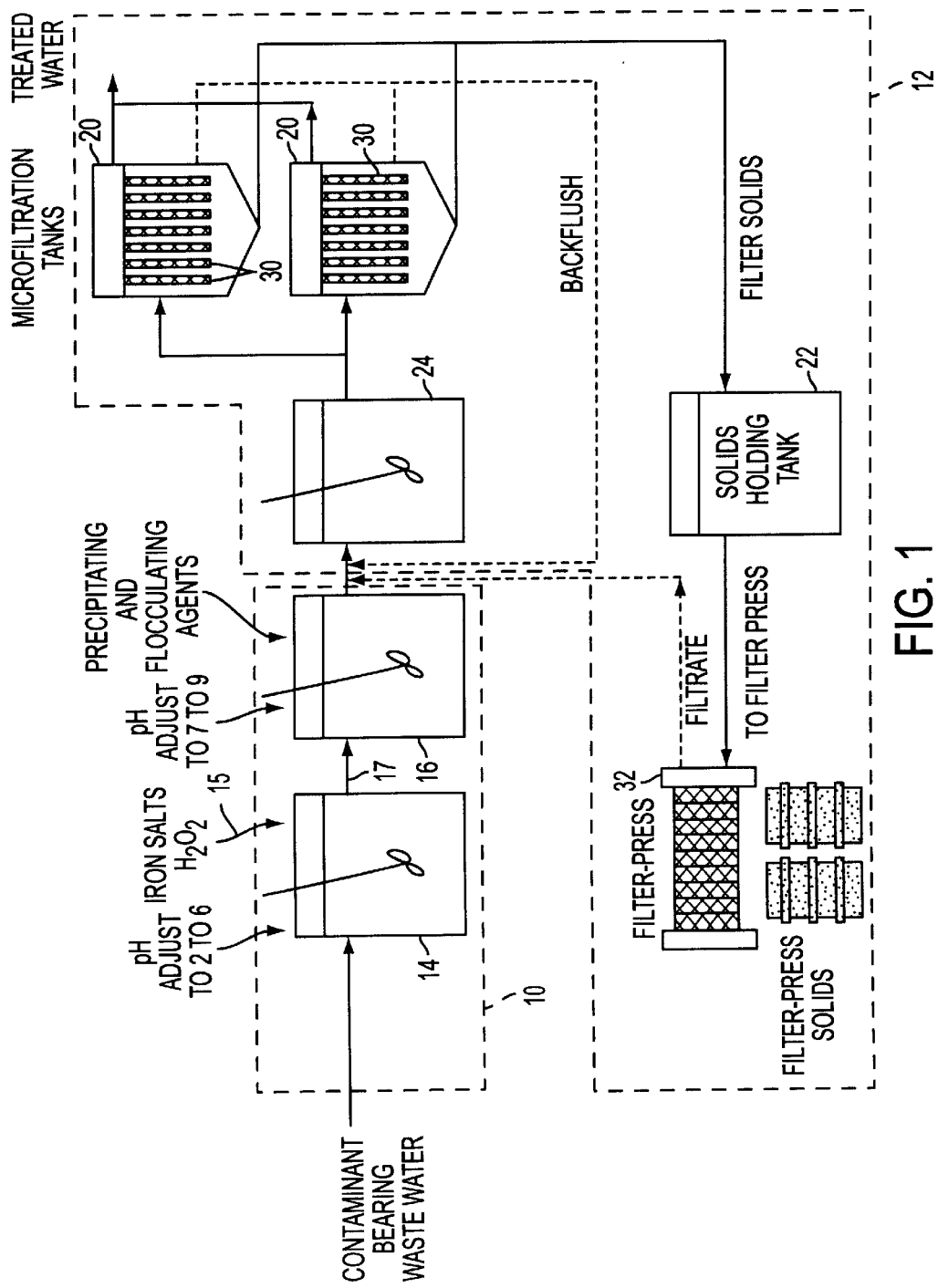
FIG. 1 is a block diagram of one example of a treatment system which may be employed with the method of the present invention.

The inventors have discovered a new method for treating industrial wastewaters which has been found to unexpectedly improve the filterability of contaminants, reduce the clogging of filters, increase the percentage of time a filter can be in operation before requiring cleaning or replacement, and increase the average flow rate of the filtered wastewater through the filter.

In general, the present invention provides a method of treating industrial wastewaters that include one or more contaminant materials by pre-treating the wastewaters with a combination of iron salts and peroxide at a pH in the range of about 2 to 6, prior to filtration of the wastewater. After pretreatment, the wastewater is treated with suitable precipitating or flocculating agents to form contaminant bearing particles. The particles are then filtered using any suitable filtration system, thereby removing the contaminant materials from the wastewater. The combination of iron salts and peroxide at the recited pH range is known as the Fenton oxidation reaction (also referred to as Fenton's Reagent). The classical Fenton reaction is used to degrade toxic organic materials to carbon dioxide, or at least to remove the toxicity by partial oxidation. This requires specific ratios of iron to peroxide, and large amounts of peroxide, for best results. The Fenton reaction is known to work by production of free radical hydroxide (•OH) and (•OOH) by decomposition of hydrogen peroxide in the pH range of about 2 to 6, in the presence of ferric or ferrous ions or other transition metal catalysts. Under other conditions, the hydroxyl or perhydroxyl radicals are not produced, and the hydrogen peroxide decomposes to oxygen and water.

The inventors believe that the specific reactions between the wastewater, iron salts and peroxide with the method of the present invention, differ from that of the classical Fenton reaction. Without wishing to be bound by any particular theory, the inventors believe that the novel reaction according to the method of the present invention appears to work by coagulation of colloidal inorganic and organic or polymeric organic contaminants materials, perhaps by a combination of oxidation and surface charge neutralization. Whatever the mechanism, there is a clear difference in filterability when the pH of the wastewater is in the selected range as compare to the filterability when the pH of the wastewater is allowed to rise to above the limit of the classical Fenton reaction.

More specifically, the present invention provides a method of treating industrial wastewaters, comprising the steps of: providing a wastewater containing one or more contaminant materials. Iron salts and peroxide are added to the wastewater. The pH of the wastewater is first adjusted to a pH in the range of about 2 to 6, preferably in the range of about 3 to 5, and the resultant reaction is allowed to reactor for at least about three minutes, and preferably in the range of about 10 minutes to 3 hours, and most preferably for about 10 to 30 minutes. After the specified period of time has elapsed, precipitating and/or flocculating agents are added to the wastewater. The pH is now adjusted to a pH of 7 or greater, preferably to a pH in the range of about 7 to 9, and contaminant bearing particles (also referred to a floc or precipitate) are formed. The wastewater is then filtered to remove the contaminant bearing particles. During filtration the pH may be maintained in the range of about 6 to 8. The wastewater may be filtered by any number of prior art systems, and the present invention is particularly suited for practice with single pass flow-through filters, and most particularly suitable for high flow rate single pass flow-through filters, such as that described in the '648 patent. The pretreatment step according to the present invention, prior to filtration produces particles that are more easily filtered and minimizes the clogging and frequency of cleaning cycles, while maintaining high filtration flow rates.

Of significant advantage, the method of the present invention may be employed to treat a wide variety of contaminant materials, which are present in a wide range of concentrations. For example, a typical industrial wastewater stream to be treated by the method of the present invention may include, but is not limited to, the following contaminant materials: $NO_3^-$, $SO_4^{2-}$, $Cl^-$, $F^-$, $NH_4$, $Cu$, $Fe$, $SiO_2$, $W$, organic chelates, detergents, dispersants, amines, solvents, and photoresists. The composition and concentration of such contaminant materials will vary depending on the type of industrial processing employed, and in general the concentration of such materials will be in the range of about less than 1 to greater than 1000 ppm per contaminant material.

The inventors have discovered that pre-treatment of the wastewater using the combination of peroxide and iron salts in the recited pH range, increases the efficiently of removing the contaminant materials from the wastewater. Specifically, the pre-treatment provides a more easily filtered precipitate. Without wishing to be bound by any particular theory, the inventors believe that the pre-treatment causes coagulation of low molecular weight colloids and high molecular weight polymers to produce a more easily filtered precipitate. Precipitates that are difficult to filter cause fouling of the filters and rapid pressure decreases in the filtration system during filtration, among other problems. The fouled or clogged filters require aggressive cleaning cycles using acidic based or detergent based materials, among other techniques. The increase in filterability resulting from the present invention is indicated by a decrease in the fouling of the filters and an increased time between cleaning cycles. The increase in filterability according to the present invention is also shown by maintaining the pressure at or below a desired value during filtration, as described further below.

In the pre-treatment step using peroxide and iron salts, the peroxide may be comprised of hydrogen peroxide and other inorganic peroxide, or organic peroxides. When organic peroxides are employed, they are preferably selected from the group of: peroxyacetic acid and sodium peracetate, and tert-butyl peroxide. When inorganic peroxides are used they are preferably selected from the group of: sodium perborate, hydrogen peroxide, sodium perphosphate, sodium peroxydisulfate, sodium monopersulfate, and sodium percarbonate. Preferably, the peroxide used is hydrogen peroxide.

Iron salts suitable for use with the present invention are ferric salts, ferrous salts, or a combination thereof, such as chlorides, sulfates or nitrates. Preferable ferric salts include those selected from the group of: ferric nitrate, ferric chloride, ferric acetate, ferric lactate, ferric ammonium sulfate, ferric ammonium chloride, ferric citrate, ferric hydroxide, ferric edta and ferric oxide. Preferable ferrous salts include those selected from the group of: ferrous chloride, ferrous acetate, ferrous lactate, ferrous ammonium sulfate, ferrous ammonium chloride, ferrous citrate, ferrous hydroxide, ferrous edta and ferrous oxide.

When adding the peroxide and iron salts to the wastewater, any grade or concentration of peroxide may be used. The iron salts may be in solid or solution form. Preferably, the concentration ratio of peroxide to iron salts in the wastewater is in the general range of about 1 part iron to 5 to 20 parts peroxide by weight. For most effective coagulation and pretreatment of the wastewater, a minimum of about 50 ppm hydrogen peroxide and about 20 ppm of iron is desired.

After the wastewater is pre-treated with the combination of peroxide and iron salts, precipitating or flocculating agents, or a combination of both, are added to form the insoluble particles or compounds (also referred to as a floc). Suitable flocculating agents include inorganic and/or organic flocculants, either anionic or cationic. Specific examples of inorganic agents include, but are not limited to sodium aluminate, aluminum chloride, aluminum sulfate, polyaluminum chloride, polyaluminum sulfate, iron salts, and aluminum or iron alums. Any conventional anionic polymer useful for wastewater treatment can be used in combination with the inorganic agent, although the exact polymer may vary with the inorganic agent selected. Additionally, a reducing agent, such as sodium bisulfite or other known reducing agents, may be added to the wastewater prior to the addition of the precipitating agents to neutralize any remaining peroxide.

The method of the present invention may be carried out with any suitable water treatment filtration system and is not limited by any particular apparatus or system. To realize the full advantage of the present invention it is preferred to carry out the method in a high flow rate, single pass, flow-through filtration system, such as that described in the '648 patent. Of course, other system may be used such as, but not limited to, bag filters, cartridge filters, paper filter, indexing filters, filter presses, sand filters and the like.

One example of a suitable water treatment system for carrying out the present invention is illustrated in FIG. 1. FIG. 1 shows a wastewater treatment system, generally comprised of a pretreatment system 10 and a filtration system 12 useful in a semiconductor lab. Preferably the filtration system is of the type described in U.S. Pat. Nos. 5,871,648 and 5,904,853, the entire disclosures of which are hereby incorporated by reference.

The pretreatment system 10 is generally comprised of one or more reaction tanks, associated mixers and delivery lines. The wastewater containing contaminant materials flows into a reaction tank 14. The pH of the wastewater in the reaction tank 14 is first adjusted to a pH in the range of about 2 to 6, preferably in the range of about 3 to 5. In an exemplary embodiment, peroxide and iron salts are added to the reaction tank 14 via chemical delivery line 15, at a concentration range of about 20 to 200 ppm iron salts and 10 to 300 ppm hydrogen peroxide, with a concentration of about 20 to 50 ppm iron salts and 50 to 100 ppm hydrogen peroxide being most preferred. The wastewater in the reaction tank 14 is stirred to mix the chemicals for a period of time to allow for the reaction to occur. The time will vary depending on the size of the reaction tanks and the initial concentration of the contaminant materials, and will generally be at least about three minutes, preferably for a period of time in the range of about 10 minutes to 3 hours, with a range of 10 to 30 minutes being most preferred.

Once the reaction is complete, the wastewater is fed to a second tank 16 via delivery line 17. Precipitating and/or flocculating agents are added to the second tank 16. Alternatively, the precipitating and/or flocculating agents may be added via an in-line mixer (not shown) placed in the delivery line 17. In one exemplary embodiment, a combination of a 30% sodium aluminate solution is added at a flow rate of about 1 ml/gal and an cationic flocculating agent is added at a concentration of about 10 ppm is added. Preferably, while adding the precipitating and/or flocculating agents, the pH of the wastewater in the second tank 16 is adjusted upwards to a pH of at least about 7, and preferably to a pH in the range of about 7 to 9. The size of the second tank 16 should be such that the residence time of the wastewater solution is about at least three minutes. At this pH range, contaminant bearing insoluble particles or compounds are formed in the wastewater. In another embodiment, a reducing agent, such as sodium bisulfite, may be added to remove any remaining hydrogen peroxide in the wastewater. In yet another embodiment, a polymer or other coagulant agent may be optionally added to the second tank 16 to aid formation of the insoluble compound.

Once formed, the contaminant bearing particles are fed by pump or gravity into a filtration system 12. Any suitable filtration system may be used. FIG. 1 illustrates only one exemplary embodiment of a suitable filtration system. The filtration system 12 in FIG. 1 is comprised generally of a membrane filtration system such as a microfiltration system described in greater detail in U.S. Pat. Nos. 5,871,648 and 5,904,853, the entire disclosures of which are hereby incorporated by reference. In this example, the filtration system generally includes one or more filter or microfiltration tanks 20 and a settling or sludge holding tank 22. A backflush tank 24 may be used, and is preferably placed prior to the filter tanks 20. The filter tank 20 is operated in two modes; namely, a filter tank operating mode and the filter tank backflush mode. The filter tank 20 generally includes a filtration membrane in a tubular "sock" configuration. The membrane sock is placed over a slotted tube to prevent the sock from collapsing during use. The membrane material is commercially available from a variety of sources, and preferably has a pore size in the range of 0.5 to 1 micron, with a pore size of 1 micron being most preferred.

During the operation mode, the contaminant bearing particles are dewatered and filtered from the wastewater. The wastewater is pumped from the filter vessel through the membrane, and as the wastewater passes through the membranes, the particles do not pass through, and instead build up on the outside of the membrane surface. The clean wastewater overflows out of the top of the filter tank for discharge or recycling. The clean wastewater is substantially free of contaminant solids or particles, and will generally contain a concentration of less than 10 ppm total suspended solids.

More specifically, the filter tank is preferably equipped with an array of microfiltration membranes 30. Preferably, the microfiltration membranes are comprised of a tubular "sock" configuration to maximize surface area. The membrane sock is placed over a slotted support tube to prevent the sock from collapsing during use. In order to achieve high flow rates and flux values, a number of membranes or membrane modules, each containing a number of individual filter socks, may be used. The microfiltration membranes preferably have a pore size in the range from 0.5 $\mu$m to 10 $\mu$m microns, and preferably from 0.5 $\mu$m to 1.0 $\mu$m. It has been found that the treated wastewater flow rate through 0.5 to 1 $\mu$m microfiltration membranes can be in the range from 200 GFD to 1500 GFD.

The microfiltration membranes are preferably provided in cassette or module or in a preformed plate containing the membrane array. In either case, the membranes are conveniently installed or removed from the top by unscrewing a collar fitting. Alternatively, the entire cassette or plate may be removed for servicing. The microfiltration membranes provide a positive particle separation in a high recovery dead head filtration array. The dead head filtration operates effectively at low pressures (3 psi to 25 psi, preferably 5 psi to 10 psi) and high flow rates, allowing a one pass treatment with up to 99.9% discharge of the supplied water. Solids which accumulate on the membrane surface during filtration are periodically backflushed away (and gravity settled) from the membrane surface to ensure a continuously clean filtration media. Currently, the preferred filter socks useful with the present invention contain a Teflon® coating on a poly (propylene) or poly(ethylene) felt backing material. Such socks are available from W. L. Gore. Another presently preferred filter sock manufactured by National Filter Media, Salt Lake City, Utah, consists of a polypropylene woven membrane bonded to a poly(propylene) or poly(ethylene) felt backing. Because the membranes are simple and inexpensive, some operations deem it more cost-effective to replace the membrane socks instead of cleaning contaminants from the membrane. However, it should be noted that the membranes are very resistant to chemical attack from acids, alkalis, reducing agents, and some oxidizing agents. Descaling of the membranes is achieved by acid washing, while removal of biofouling may be accomplished by treatment with hydrogen peroxide, dilute bleach, or other suitable agents.

To remove the contaminant bearing particles from the membrane surface and the filter tank, the filter tank is placed in backflush mode. The membranes are periodically backflushed to keep the flow rate high through the system. Solids are preferably removed from the membrane surface by periodically backflushing the microfiltration membranes and draining the filtration tank within which the membranes are located. Preferably, the backflush is initiated when the pressure at the membrane builds to approximately 6 psi. The periodic, short duration back flush removes any buildup of contaminants from the walls of the microfiltration membrane socks. Backflush is achieved but is not restricted to a gravity scheme, i.e., one in which a valve is opened and the 1 to 2 feet of water headspace above the filter array provides the force that sloughs off the filter cake. The dislodged solid material within the filtration tank is then transferred into the sludge holding tank 22 for further processing of the solids. The microfiltration as described is fully automated and can run 24 hours, seven days a week, with minimal input from the operator. The system may be completely automated using process logic control (PLC) which can communicate with supervisory and control data acquisition systems (SCADA). Simple and rugged hardware continuously monitors the characteristics of the influent and effluents and adjusts the chemical feed as needed. Examples of parameters automatically monitored include pH, turbidity, oxidation reduction potential, particle zeta potential, and metal contaminant concentration. Process development and fine-tuning is achieved by continuous monitoring of the process parameters followed by control adjustment. In the backflush mode, the flow of the system is reversed where water from the headspace above the filter array flows in reverse. This is achieved by opening a valve on the filter tank. The particles or sludge settles on the bottom of the filter tank, and then are pumped or gravity feed to the sludge holding tank 22 and removed. A filter press 32 may be used to provide further dewatering of the particles, if desired. It is important to note that while one type of treatment system has been described, the method of the present invention may be carried out in a wide number of different types of treatment systems, such as for example gravity settling and cross-flow filtration systems.

The method of the present invention is also suitable for use with other types of standard filtration systems, such as cross-flow filtration units, microfiltration units, and ultrafiltration units. It is useful as a pretreatment method, followed by appropriate filtration, to minimize fouling and maximize efficiency of reverse osmosis (RO) and ion exchange (IX) systems after filtration. RO and IX systems are susceptible to fouling by organic materials, especially colloids and high molecular weight materials. This novel process easily and effectively removes such materials. While the focus of the examples are directed to industrial wastewaters such as those produced by electroplating, printed circuit manufacturing, electro-less nickel, grinding and machining, the process is equally applicable to semiconductor wastewater which contains organic and other contaminant materials as further described in U.S. patent application Ser. No. 09/894,275 filed simultaneously herewith and incorporated by reference.

EXPERIMENTAL

The following experiments are offered for illustrative purposes only, and are not intended to limit the scope of the present invention in any way.

The filtration apparatus used for each of the following examples was a single pass closed end filter unit, operating at low differential pressure of less than 15 psi, with a high flux rate of greater than 100 gal/day/ft$^2$ of filter area.

Example 1

The wastewater is a mixture of silica chemical mechanical polishing wastewater (CMP) and iron CMP, plus cleaners, acids, and other compounds. The wastewater had a complex mixture of about 3300 ppm silica, 500 ppm nitrate, 600 ppm ammonia, 2.5 ppm copper, 150 ppm iron, TMAH 35 ppm, detergent 20 ppm, dispersing agent 4 ppm, organic antitarnish agent 15 ppm, and organic amine 100 ppm. To this was added 90 ppm of hydrogen peroxide in a first tank (called tank 1 as shown on FIG. 2). The initial pH was adjusted as is shown in FIG. 2, a graph of pH and filter pressure over time.

Figure 2:
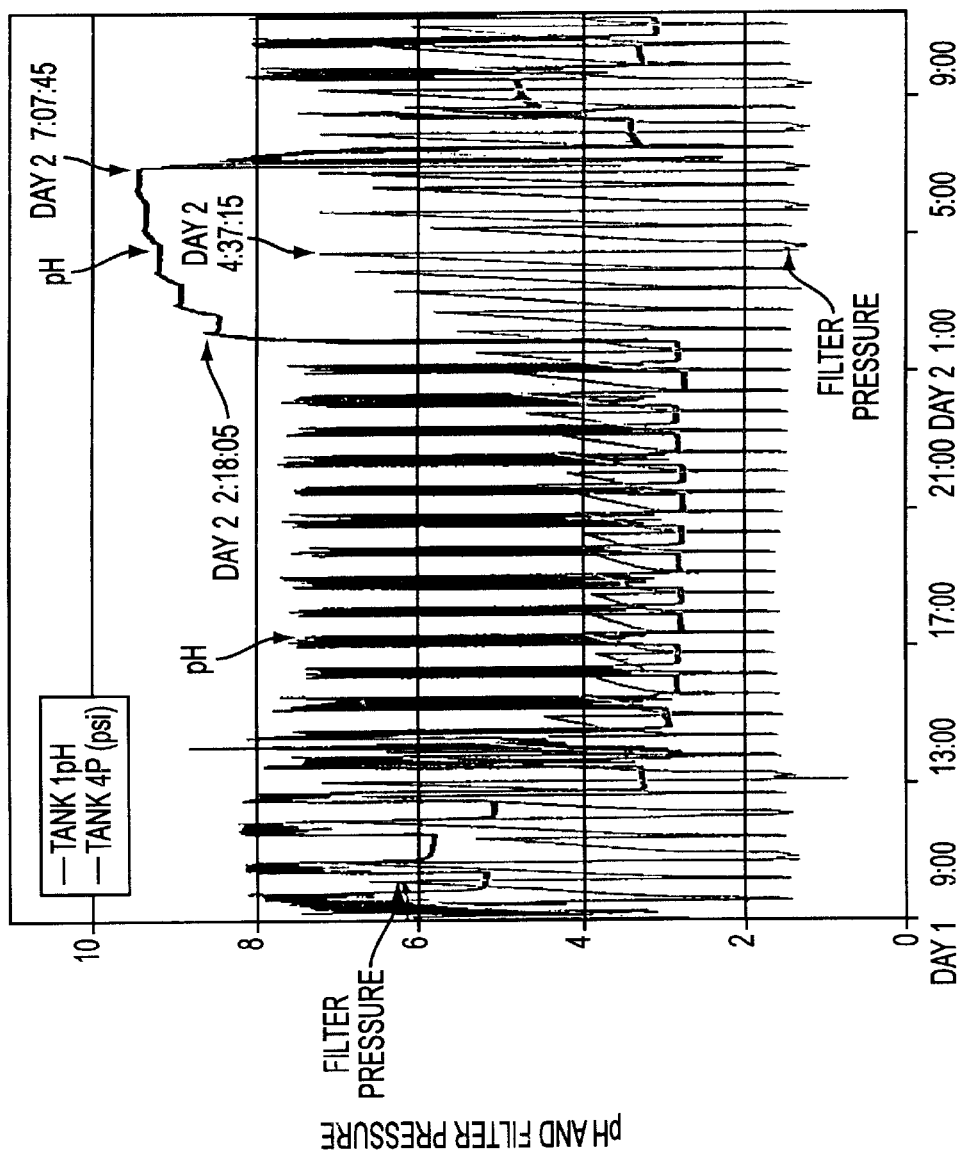
FIG. 2 is a graph illustrating pH and filter pressure over time for experiments conducted according to embodiments of the method of the present invention.

The pH of tank 1 is illustrated on FIG. 2, and this is where the incoming wastewater was collected. The pH is adjusted in tank 1, and hydrogen peroxide is added. The high/low values of pH are due to the semi-batch nature of the waste treatment system. The tank 1 was filled to the upper fill mark, and the pH of the highly incoming wastewater was adjusted. The tank fills faster than the pH is adjusted, so during the fill cycle the pH of tank 1 is seen to rise. Once the tank is full, the pH adjustment is finished. The solution is now pumped out of tank 1 until the low level setting is reached. The Fenton reaction can occur during the period when the pH is adjusted. The higher pH period may or may not be significant, as the whole solution is adjusted to the pH set point and then reacts. The set point was initially pH 5–6, as is seen in the first part of the FIG. 2. The filter pressure is measured by the maximum pressure attained by its line. A lower filter pressure is desirable as it indicates free flow through the precipitated solids. A high flow indicates that the solids are sticky or not fully treated. Organic materials will interfere with the coagulation process in the tank, and cause a higher filter pressure.

The wastes are further treated after completion of the Fenton reaction. The pH adjusted and Fenton-treated wastewater is pumped from tank 1 to a second tank where sodium bisulfite is added in sufficient quantity to destroy the remaining hydrogen peroxide.

The wastes are then allowed to overflow to another tank, where EnChem 0696 (an inorganic coagulant), 0.17 ml per liter, and EnChem 9025 (an organic polyelectrolyte flocculant), 0.02 ml per liter, are added. The pH is also adjusted to pH 7–8 at this time. These additives agglomerate all solids into particles, and convert them into large, hard, non-sticky particles. This makes them suitable for treatment in a low pressure filtration process.

Some types of organic materials, and large quantities of organic materials, will interfere with the formation of the large, hard, non-sticky particles and thus cause an increase in filter pressure.

The treated wastes overflow to a collection or surge tank. The wastes are pumped from the surge tank through a low pressure filtration system using the EnChem membrane technology. The filter pressure in this system is illustrated in FIG. 2 as the tank 4 line. Thus the filter pressure was 6–7 psi maximum during the first four hours of the test, from 09:00 to about 13:00. This is an excellent low filter pressure, showing low energy consumption and low fouling of the membranes. The Fenton reaction was effective at the pH 5–6 set point, with approximately 30 minutes residence time. A longer time at this pH would give even more Fenton reaction destruction of the organic components of the wastewater.

Example 2

The wastewater continued to be treated and filtered. There was no change to the wastewater composition, wastewater treatment chemicals, amount of peroxide, amount of bisulfite, holding time, or other variable, except for the pH adjustment in tank 1. At approximately 13:00 the system controls were adjusted to maintain approximately pH 3 in tank 14. FIG. 2 shows that the low pH, after filling the tank 1, was about pH 3 until approximately 01:00 on the next (second) day.

During this period the treated wastewater showed destruction and/or modification of the organic components of the wastewater. The filter pressure rapidly dropped to about 4 psi to 5 psi. This is a very significant improvement, showing that less energy is needed to filter a Fenton reaction treated waste. The lower pH gave significantly more organic destruction and/or modification than the higher pH as shown in Example 1.

Example 3

The wastewater testing continued. At approximately 02:00 on the second day, pH adjustment to tank 1 was discontinued. The pH rose to the pH of the incoming wastewater, pH 8–9. The filter pressure rose during this period back up to about 7 psi. This showed that the Fenton reaction was no longer occurring to any significant extent due to the high pH, which is outside of the range which allows the Fenton reaction to occur. The filter pressure increased as the solids which were not treated by the Fenton reaction, mixed with the treated solids.

Example 4

The wastewater testing continued. At approximately 07:00 on the second day, pH adjust to tank 1 was reinstated. The pH was adjusted to about pH 3–4. The filter pressure began to drop again, as the Fenton reaction treated solids mixed in with the non-Fenton reaction treated solids. The filter pressure had dropped to 6 psi by the conclusion of the test.

As taught by the foregoing description and examples, an improved method for treating semiconductor wastewaters has been provided by the present invention. The foregoing description of specific embodiments and examples of the invention have been presented for the purpose of illustration and description, and although the invention has been illustrated by certain of the preceding examples, it is not to be construed as being limited thereby. The examples are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

We claim:

1. A method for treating industrial wastewater which includes organic contaminant materials, wherein the industrial wastewater is to be filtered and is pre-treated, said method including pretreatment steps comprising the steps of
   providing a combination of iron salts and peroxide to the wastewater
   maintaining the wastewater with said iron salts and peroxide at a pH in the range of about 2–6 for a specified time to oxidize said organic contaminant materials
   after said specified time adding a precipitating or flocculating agent and adjusting pH of said wastewater to a pH above about 7 so as to coagulate the organic contaminant materials in said wastewater into removable solids
   such that the removable solids have enhanced filterability and resistance to filter clogging or fouling, and passing the wastewater through a microfiltration membrane having a pore size in the range from 0.5 to 10 microns at a flow rate of at least 200 gallons per square foot of membrane per day, to remove said removable solids.

2. The method of claim 1 wherein the pH of the industrial wastewater is maintained in the range of about 3 to 5 during said pretreatment with the combination of iron salts and peroxide.

3. The method of claim 1 wherein the iron salts are comprised of ferric salts, ferrous salts, or combinations thereof.

4. The method of claim 3 wherein said ferric salts are selected from the group of:
   ferric nitrate, ferric chloride, ferric acetate, ferric lactate, ferric ammonium sulfate, ferric ammonium chloride, ferric citrate, ferric hydroxide, ferric ethylenediaminetetracetic acid (edta) and ferric oxide.

5. The method of claim 3 wherein said ferrous salts are selected from the group of:

ferrous chloride, ferrous acetate, ferrous lactate, ferrous ammonium sulfate, ferrous ammonium chloride, ferrous citrate, ferrous hydroxide, ferrous ethylenediaminetetracetic acid (edta) and ferrous oxide.

6. The method of claim 1 wherein the peroxide is comprised of organic peroxides or inorganic peroxides.

7. The method of claim 6 wherein said organic peroxides are selected from the group of: peroxyacetic acid and sodium peracetate.

8. The method of claim 6 wherein said inorganic peroxides are selected from the group of:

sodium perborate, hydrogen peroxide, sodium perphosphate, sodium peroxydisulfate, sodium monopersulfate, and sodium percarbonate.

9. The method of claim 1 further comprising the step of:

following said pre-treatment step, adding organic precipitating or flocculating agents, or a combination thereof, to promote formation of insoluble contaminant bearing particles.

10. The method of claim 9 wherein the removable solids are removed by a single pass microfiltration membrane system.

11. The method of claim 1 wherein said pretreatment is carried out for a time of at least about three minutes.

12. The method of claim 1 further comprising the step of:

treating the industrial wastewater with a reducing agent prior to filtration, to destroy any residual peroxide.

13. The method of claim 1 wherein said peroxide is added in an amount equal to 5 to 1000 parts per million.

14. The method of claim 13 wherein said peroxide is added in an amount equal to 20 to 200 parts per million.

15. The method of claim 1 wherein said iron salts are added in an amount equal to about 10 to 20 parts per million.

16. A method of treating industrial wastewater, comprising the steps of providing an industrial wastewater having one or more organic contaminant materials;

adding a combination of ferric or ferrous salts, and hydrogen peroxide to the wastewater, first adjusting the pH of the wastewater to a pH in the range of about 3 to 5 maintaining said pH for a specified time to oxidize said organic contaminant materials, introducing precipitating or flocculating agents to the wastewater, and, second adjusting the pH of the wastewater a pH of at least 7 wherein insoluble contaminant bearing particles form coagulated removable solids having enhanced filterability and resistance to filter clogging or fouling; and filtering the coagulated removable solids from the wastewater by passing the wastewater through a microfiltration membrane having a pore size in the range from 0.5 to 10 microns at a flow rate of at least 200 gallons per square foot of membrane per day.

17. The method of claim 16 wherein said precipitating or flocculating agents are selected from the group of:

sodium aluminate, aluminum chloride, aluminum sulfate, polyaluminum chloride, polyaluminum sulfate, iron salts, and aluminum or iron alums.

18. The method of claim 16 wherein said ferric salts are selected from the group of:

ferric nitrate, ferric chloride, ferric acetate, ferric lactate, ferric ammonium sulfate, ferric ammonium chloride, ferric hydroxide, ferric ethylenediamine tetacetic acid (edta) and ferric oxide.

19. The method of claim 16 wherein said ferrous salts are selected from the group of:

ferrous chloride, ferrous acetate, ferrous lactate, ferrous ammonium sulfate, ferrous ammonium chloride, ferrous citrate, ferrous hydroxide, ferrous ethylenediamine tetacetic acid (edta) and ferrous oxide.

20. A method of minimizing fouling of filters in a filtration system that receives a wastewater which includes organic contaminant materials to be treated, characterized in the that wastewater is treated with a combination of iron salts and peroxide, prior to at a pH below 6 for a specified time to oxidize said organic contaminant materials, followed by raising the pH above 7 and adding one or more precipitating or flocculating agents to form coagulated particles of enhanced filterability that do not substantially foul the filters during filtration, and passing the wastewater through a microfiltration membrane having a pore size in the range from 0.5 to 10 microns at a flow rate of at least 200 gallons per square foot of membrane per day, to remove said coagulated particles.

* * * * *